(12) United States Patent
Haller

(10) Patent No.: US 7,088,066 B2
(45) Date of Patent: Aug. 8, 2006

(54) AUTOMATIC OUTPUT POWER LIMITING ELECTRICAL DEVICE

(75) Inventor: William R. Haller, Bethlehem, PA (US)

(73) Assignee: Thor Power Corp., Bethlehem, PA (US)

(*) Notice: Subject to any disclaimer, the term of this patent is extended or adjusted under 35 U.S.C. 154(b) by 101 days.

(21) Appl. No.: 10/873,536

(22) Filed: Jun. 21, 2004

(65) Prior Publication Data

US 2005/0280385 A1   Dec. 22, 2005

(51) Int. Cl.
- H02P 27/04 (2006.01)
- H02J 5/00 (2006.01)
- B25B 23/151 (2006.01)

(52) U.S. Cl. .................. 318/432; 318/434; 318/139; 388/815; 388/930; 388/937; 173/5

(58) Field of Classification Search .......... 318/700, 318/729, 799–811, 720–724, 254, 439, 599–603, 318/434, 798, 139, 432; 388/809–823, 904, 388/918, 930, 937, 907.5; 323/201; 173/2, 173/217, 176, 4, 5, 7, 11; 81/467, 469

See application file for complete search history.

(56) References Cited

U.S. PATENT DOCUMENTS

| | | | | |
|---|---|---|---|---|
| 4,489,261 A | * | 12/1984 | Hartwig et al. | 318/700 |
| 4,742,470 A |   | 5/1988 | Juengel | 364/474 |
| 4,745,557 A |   | 5/1988 | Pekar et al. | 364/474 |
| RE32,837 E |   | 1/1989 | Corni | 235/375 |
| 4,820,962 A |   | 4/1989 | Millauer | 318/602 |
| 4,860,185 A | * | 8/1989 | Brewer et al. | 363/41 |
| 4,900,252 A |   | 2/1990 | Liefke et al. | 433/27 |
| 5,959,440 A | * | 9/1999 | Tobita et al. | 323/237 |
| 6,107,762 A | * | 8/2000 | Schauer | 318/245 |
| 6,320,286 B1 | * | 11/2001 | Ramarathnam | 310/50 |
| 6,360,136 B1 |   | 3/2002 | Lamers | 700/225 |
| 6,424,799 B1 | * | 7/2002 | Gilmore | 388/811 |
| 6,536,536 B1 | * | 3/2003 | Gass et al. | 173/2 |
| 6,566,843 B1 | * | 5/2003 | Takano et al. | 320/114 |
| 6,568,593 B1 |   | 5/2003 | Hetzer | 235/385 |
| 6,573,621 B1 | * | 6/2003 | Neumann | 307/150 |
| 6,630,993 B1 | * | 10/2003 | Hedges et al. | 356/141.4 |
| 6,765,317 B1 | * | 7/2004 | Chu | 307/150 |
| 6,834,730 B1 | * | 12/2004 | Gass et al. | 173/2 |
| 6,836,614 B1 | * | 12/2004 | Gilmore | 388/811 |
| 7,007,762 B1 | * | 3/2006 | Yamamoto | 173/1 |
| 2003/0121685 A1 | * | 7/2003 | Yamamoto | 173/217 |

(Continued)

FOREIGN PATENT DOCUMENTS

DE          3518902 A1     11/1986

(Continued)

OTHER PUBLICATIONS

Christophe Basso: "Conducted EMI Filter Design for the NCP1200", On Semiconductor, Apr. 2001—Rev.2 (16 pages).

(Continued)

*Primary Examiner*—Lincoln Donovan
*Assistant Examiner*—Eduardo Colon Santana
(74) *Attorney, Agent, or Firm*—Lackenbach Siegel LLP

(57) ABSTRACT

An eletrical device derives power from an incoming power source to produce output plower to drive the device. The device includes circuitry that determines at lehst one characteristic of the incoming power source, and adjusts the output power used to drive the device based on the characteristic or characteristics of the incoming power source.

17 Claims, 4 Drawing Sheets

U.S. PATENT DOCUMENTS

2005/0103510 A1* 5/2005 Gass et al. .................. 173/217
2005/0279197 A1* 12/2005 Wottreng et al. ............. 81/469

FOREIGN PATENT DOCUMENTS

JP          2004304977 A  * 10/2004

OTHER PUBLICATIONS

Jingquan Chen et al.: "Buck-Boost PWM Converters Having Two Independently Controlled Switches" (6 pages).
Jingquan Chen et al.: A New Low-Stress Back-Boost Converter for Universal-Input PFC Applications (7 pages).
L. Rossetto et al.: "Control Techniques for Power Factor Correction Converters" (9 pages).
Jingquan Chen et al.: "Analysis and Design of SEPIC Converter in Boundary Conduction Mode for Universal-line Power Factor Correction Applications" (6 pages).
Libor Prokop et al. "Sensorless BLDC Motor Control on MC68HC908MR32 Software Description" Motorola, Inc., 2002 (67 pages).

Preliminary Information, Application Brief: The Single-Phase Indirect Digital Power Factor Correction using Motorola DSP5680x. (4 pages).
Philip Todd: "UC3854 Controlled Power Factor Correction Circuit Design" (21 pages).
Bill Andreycak: "Power Factor Correction Using the UC3852 Controlled On-Time Zero Current Switching Technique" (17 pages).
Laszlo Balogh: "Unitrode—UC3854A/B and UC3855A/B Provide Power Limiting With Sinusoidal Input Current for PFC Front Ends" SLUA196A—Jun. 1995—Revised Nov. 2001 (15 pages).
Bill Andreycak: "UC384A and UC3854B Advanced Power Factor Correction Control Ics" (24 pages).
Philip Todd: "Boost Power Factor Corrector Design With the UC3583" (2 pages).
James P. Noon et al.: "UC3855A/B High Performance Power Factor Preregulator" (21 pages).

* cited by examiner

AUTOMATIC OUTPUT POWER LIMITING ELECTRICAL DEVICE

FIELD OF THE INVENTION

The present invention generally relates to electrically powered devices. More particularly, the present invention relates to electrically powered devices with circuitry for limiting the output power of the device.

Electrically powered devices, such as power hand tools, are increasingly using brushless DC ("BLDC") motors instead of conventional AC motors. BLDC motors are generally reliable, even at high speed, due to the brushless aspect of the motors, are highly efficient, and produce low electromagnetic interference ("EMI"). BLDC motors unlike their AC based counterparts require a high efficiency AC to DC power converter to convert the incoming AC input power to DC output power. Additionally, stringent domestic and international regulatory requirements require that the power converter use power factor correction circuitry to address harmonic issues.

In order for BLDC devices, as well as other electrically powered devices, to achieve broad market penetration, the devices should operate over a broad range of AC voltages, e.g., from 110–220 VAC 60 Hz for the US market and nominally 220–240 VAC 50 Hz for the European market. To achieve this aspect, the device's power supply is generally adopted to provide the same DC output power irrespective of the AC input. The AC current drawn by the device for a given DC output power, however, will vary based on the input AC voltage. For example, a device with an output power of 2 KW operating at 110 VAC, assuming a conversion efficiency of 90%, will draw an input current in excess of 20 Amps. A similar device with the same output power of 2 KW operating at 220 VAC, also assuming a 90% conversion efficiency, will draw an input current of only 10 Amps. Thus an electrically powered device that operates both in the US and European markets will draw considerably different currents for the same output power.

A problem arises, however, since US circuits operating at 110 VAC are typically limited to either a 15 Amp or 20 Amp capacity. As a result, the larger current required to operate electrically powered devices at the lower AC voltage may trip circuit breakers or other circuit protection devices, which results in the loss of power to the device. It can be appreciated that the unexpected loss of power can create hazardous conditions in certain instances. Accordingly, there is a need for electrically powered devices, such as power tools, in which the power output of the device is limited in order for the device to operate safely from circuits with a limited current capacity.

BRIEF SUMMARY

In one preferred embodiment of the invention, electrically powered devices are provided that derive power from an incoming power source to produce output power to drive the device. The device includes circuitry that determines at least one characteristic of the incoming power source, and circuitry that adjusts the output power to drive the device based on the characteristic or characteristics of the incoming power source. In another preferred embodiment of the invention, the circuitry is not included within the electrically powered device and is instead provided in a separate power converter that receives the AC power source and provides DC output power to the device. The preferred embodiments thereby beneficially provide electrically powered devices that operate at reduced or lower output power, which correspondingly reduces the current drawn from the incoming power source, so that the device may be operated safely irrespective of the characteristics of the incoming power source. The incoming power source provides AC power and the characteristic of the incoming power source is the voltage, frequency, or a combination thereof, of the incoming AC power.

The preferred embodiments are applicable to various types of electrically powered devices, such as those that include one or more brushless DC motors that are driven with DC output power. The electrically powered devices may be, for example power tools, hand operated or otherwise, such as grinders, drills, saws, etc.

In another aspect of the preferred embodiments of the invention, an electrically powered device is provided that derives power from an incoming AC power source to produce DC output power to drive the device. The device includes at least one brushless DC motor and at least one controller adapted for: determining the voltage, frequency, or a combination thereof, of the incoming AC power source, and adjusting the DC output power to drive the brushless DC motor based on the voltage, frequency, or a combination thereof, of the incoming AC power source.

In another aspect of the preferred embodiments of the invention, an electrically powered device is provided that derives power from an incoming AC power source to produce DC output power to drive the device. The device includes at least one brushless DC motor and at least one controller adapted for: determining the voltage, frequency, or a combination thereof, of the incoming AC power source, and increasing the DC output power to drive the brushless DC motor, which normally operates at low power, if it is determined that the incoming power source is a high voltage power source, the incoming power source is a low frequency power source, or a combination thereof.

DETAILED DESCRIPTION OF THE PREFERRED EMBODIMENTS

The preferred embodiments generally provide electrically powered devices that determine at least one characteristic of the incoming power, such as the voltage and/or frequency of incoming AC power, and that limit or adjust the output power of the device based on the incoming power characteristic, automatically or otherwise. This aspect of the preferred embodiments beneficially allows an electrically powered device or a portion thereof, such as a power supply/power converter, to limit or adjust the output power supplied by the device and correspondingly to limit or adjust the current drawn by the device thereby preventing the tripping of circuit breakers at low input voltages. Although the preferred embodiments are described by way of example in relation to certain types of electrically powered devices, such as power tools, and more particularly to power supplies/converters for driving devices with BLDC motors, it is understood that the preferred embodiments are generally applicable to a variety of different types of devices and is therefore not limited thereto.

Figure 1:
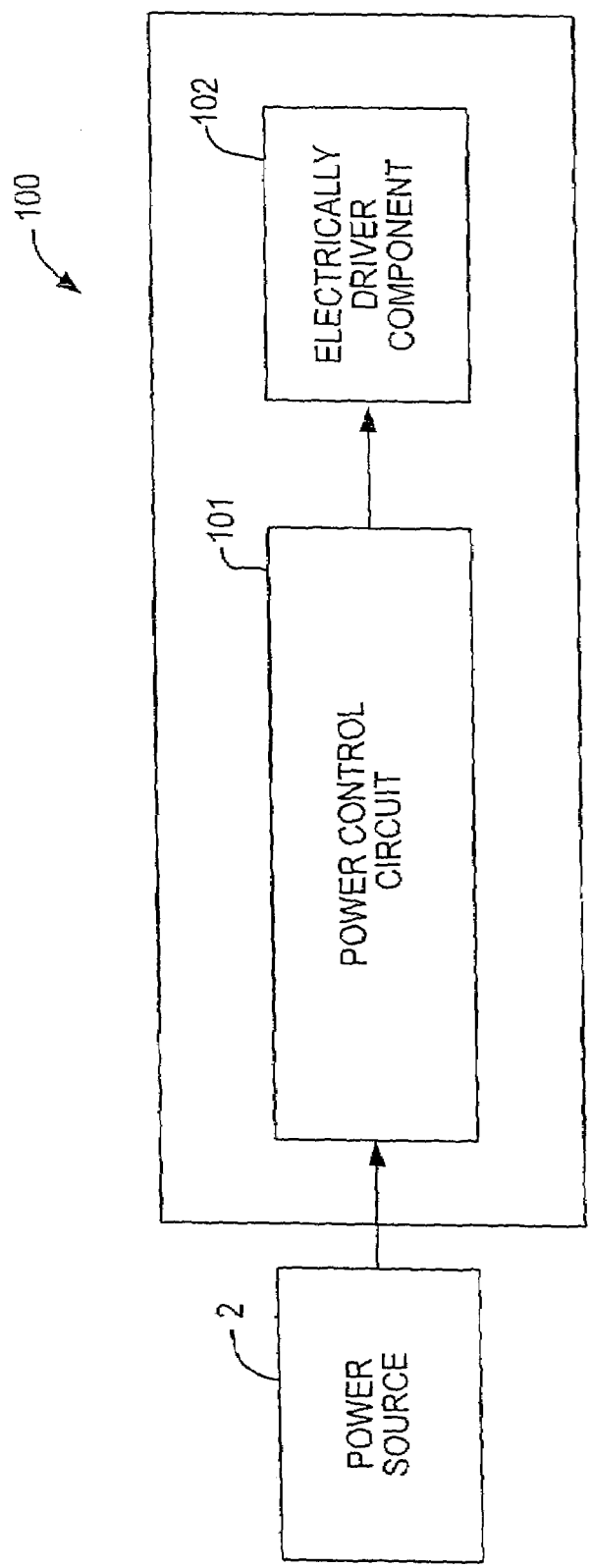
FIG. 1 is a block diagram showing the major components of an automatic out-power limiting electrically powered device in which the preferred embodiments of the invention may be implemented.
Figure 4:
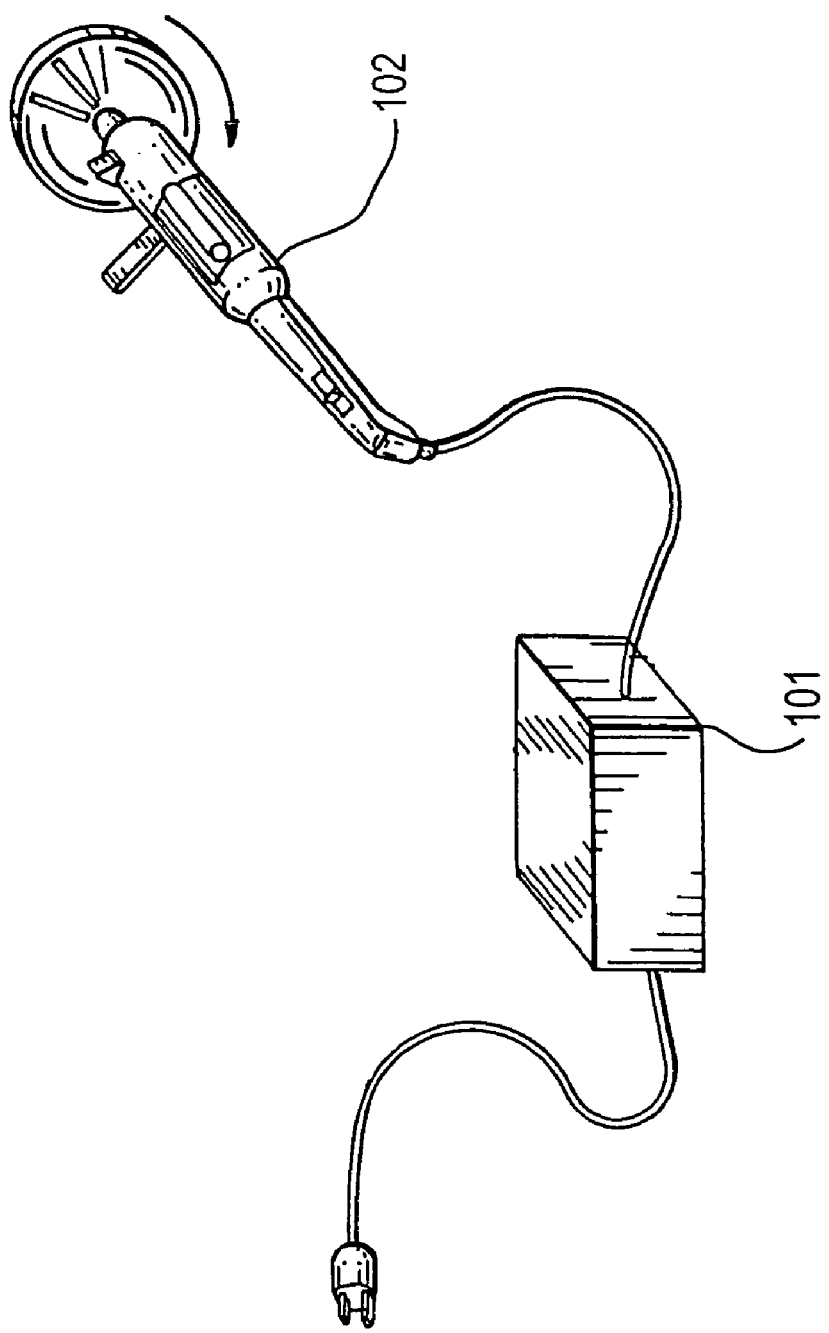
FIG. 4 is a diagram of a preferred embodiment of the invention in which an electrically powered device receives DC power from a separate power converter containing circuitry according to a preferred embodiment of the invention.

Referring to FIG. 1, an automatic output-power limiting electrically powered device 100, in which the preferred embodiments may be implemented, comprises several major components. In a preferred embodiment, the electrically powered device 100 includes power control circuitry 101 for driving an electrically powered component 102 of the device 100, which circuitry determines at least one characteristic of the incoming power 2, such as the voltage and/or frequency of incoming AC power, and that limits or adjusts the output power to drive the electrically driven component 102 of the device 100 based on the incoming power characteristic. The power control circuitry 101 may be integrated with the electrically driven component 102 into a single unit or may be a separate component distinct from the electrically powered device, as shown in FIG. 4. In the instance the power control circuitry 101 is separate from the electrically powered device 101, the size of the portion of the electrically powered device that houses the electrically driven component 102 may be minimized, which with regard to power tools minimizes user fatigue.

Figure 2:
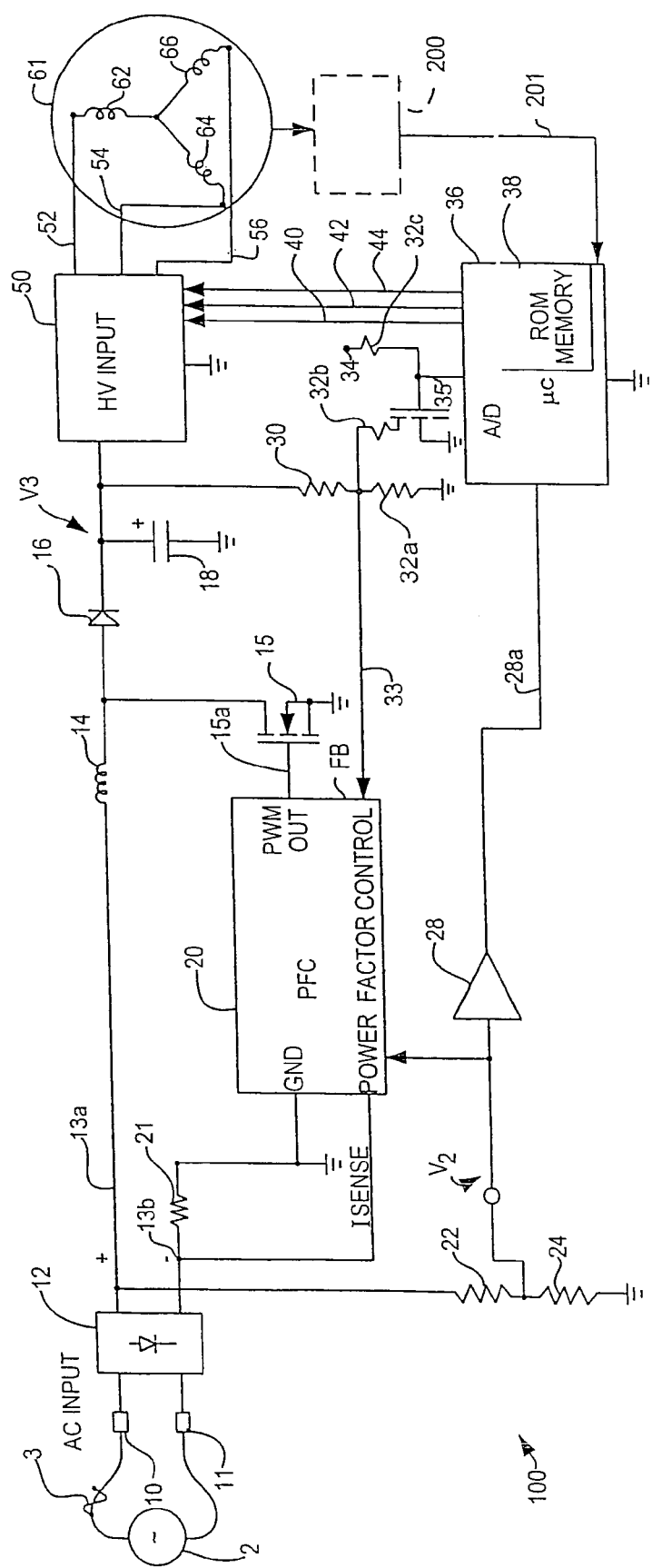
FIG. 2 is a partial circuit diagram included according to a preferred embodiment of the invention.

Referring to FIG. 2, the power control circuitry 101 generally includes at least one controller, such as a power factor controller 20 or a microcontroller 36, or other circuitry for sensing at least one characteristic of the incoming power from a power source, such as from an AC power source 2, for comparing the characteristic to one or more previously set reference values, and reducing or otherwise adjusting the power output available to drive the device 100 based on the characteristic of the incoming power. It is understood that the power output may be adjusted or reduced in a variety of ways, such as by reducing or limiting the output voltage and/or current that is used to drive the device 100, or by increasing an overload current signal to the controller 20, which correspondingly causes the controller 20 to reduce the output power to drive the device 100.

The electrically powered device 100, such as a power tool, includes a BLDC motor 61 driven by one or more controllers, including but not limited to one or more of the following: a power factor controller 20, such as On Semiconductor P/N NCP1650, a microcontroller 36, such as Motorola Semiconductor P/N 68HC908MR32, an inverter bridge module 50, such as Powerex, Inc. P/N PS 11035, etc.

The power factor controller 20 is generally capable of sensing the total current drawn by the device 100 at load and limiting the current available to drive the device 100. The inverter bridge module 50 generally supplies the necessary DC power signal to drive the BLDC motor 61. The microcontroller 36 may be used to control the inverter bridge module 50.

The AC power source 2 supplies power to the device 100 with connections to the device power terminals 10 and 11. One or more protective fuses 3 may be included in the incoming power circuit for over current protection. Incoming AC power flows to a bridge rectifier 12 where it is rectified to produce a haversine voltage signal V1 between lines 13a and 13b having + and − polarity, as shown, for use in powering the BLDC motor 61. Line 13a connects to one end of resistor 22. The other end of resistor 22 connects to one end of resistor 24 and further connects to Vin of power factor controller 20 and to the input of amplifier 28. It is understood that the combination of resistors 22 and 24 form a conventional voltage divider that reduces the voltage V1 through resistor 22 and 24 to voltage V2. FIGS. 3a–3d illustrate various plots of haversine voltages V2 over time for both low and high AC power voltages each at different frequencies of 50 (low) and 60 Hz (high). The magnitude of the haversine voltages depends directly on the magnitude and on the frequency of the incoming power from AC power source 2. A distinction can be seen between all four voltages V2a, V2b, V2c and V2d that may be used by the controller 36 for sensing the incoming characteristic voltage and/or frequency.

Line 13a further connects to one terminal of power inductor 14. The other end of power inductor 14 connects to the anode of diode 16 and also connects to the drain of a switching MOSFET transistor 15. The source of transistor 15 is connected to the circuit ground and the gate of transistor 15 is driven from the output of the power factor controller 20 via line 15a. The output is preferably a pulse width modulated waveform that causes transistor 15 to be in either the conducting on state or non-conducting off state in accordance with the modulated waveform.

The cathode end of diode 16 connects to the positive end of an electrolytic filter capacitor 18, to the power input of an inverter bridge module 50, such as a 3 phase IGBT inverter bridge, or a combination thereof. In this instance, the controller 20, in combination with inductor 14, diode 16, and capacitor 18, may produce a DC voltage V3 of about 400 volts. The inverter bridge 50 supplies the DC power to a BLDC motor 61 via lines 52, 54, and 56, which are connected to motor windings 62, 64, and 66, respectively. The inverter bridge 50 is controlled by microcontroller 36, which provides pulse width modulated signals, via lines 40, 42 and 44. The commutation circuits for either brushless sensing or hall effect sensing are not shown in any detail since these circuits are well known in the art. Rather, these circuits are shown generally as block 200. The brushless sensing or hall effect sensing circuits generally provide via line 201 positional feedback signals necessary for the controller 36 to control the BLDC motor 61.

The positive end of capacitor 18 further connects to one end of resistor 30. The other end of resistor 30 connects to resistor 32a, controller 20 input FB for voltage feedback, and one end of resistor 32b. The other end of resistor 32b connects to the drain of transistor 34. The source of transistor 34 is grounded. The gate of transistor 34 connects to one end of pull-down resistor 32c, and control line 35 from controller 36, which provides a signal to control the operation of transistor 34. The other end of pull-down 32c resistor connects to ground.

The output of amplifier 28 connects to the A/D input of controller 36 via line 28a. Amplifier 28 buffers voltage V2 from the A/D input of controller 36. Finally, one end of resistor 21 connects to ground and the other end of resistor 21 connects to line 13b, which also connects to Isense input of controller 20. Resistor 21 senses the total load current drawn by the device 100 and produces a proportional voltage that is provided for Isense input of controller 20. Controller 20 therewith senses the voltage and, depending upon the magnitude of the voltage provided to the Isense input, limits the current drawn from the AC source 2. The compensation networks for power and voltage loop stability are not shown with controller 20 as these are well known in the art.

The controller 20 senses the feedback voltage on line 33 and compares the feedback to an internally generated reference voltage. For the NCP 1650 controller, the reference voltage is 4.0 volts. An error signal is generated from the difference between the feedback voltage on line 33 and the internal 4.0 volt reference, which error signal may subsequently be used to control the width of the pulse width modulated output signal provided by the controller 20 to line 15a. Thus, if the voltage on line 33 falls below the threshold, e.g., 4.0 volts, the controller 20 may increase the width of the "on" pulse. Similarly, if the voltage on line 33 increases above 4.0 volts, the controller 20 may decrease the width of the "on" pulse provided to line 15a. The voltage on line 33, supplied to the inverter bridge module 50 to drive the motor 61, is therefore divided and compared by the power factor controller 20 with a reference voltage and based on the comparison, the controller 20 adjusts the power supplied to the motor 61 for the varying conditions.

The Voltage V3=((R32a+R30)/R32a)*the reference voltage. Therefore, for a V3 equal 200 volts for a low voltage AC power source with a 4-volt reference voltage, resistors 30 and 32a may have respective values of 453K ohms and 9.09K ohms. The output voltage V3 is directly related to the value of the resistance seen from line 33 to ground. Accordingly, the resistance between line 33 and ground can therefore be adjusted to provide the desired V3 voltage or output power. The resistance is adjusted with a control signal generated by the controller 36 to control transistor 34.

Figure 3C:
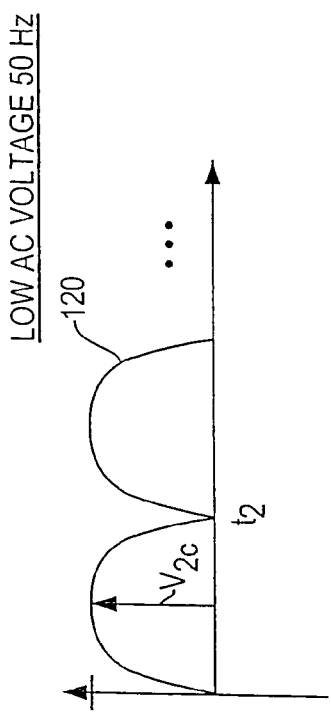
FIGS. 3a–3d are graphical representations showing the various haversine voltages for a plurality of different types of input-power.
Figure 3D:
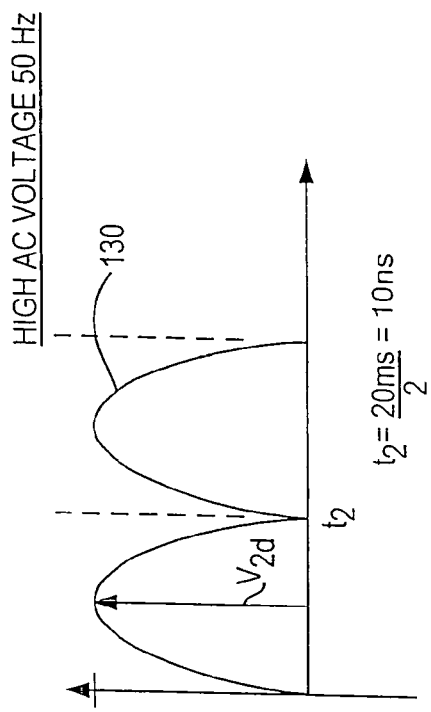
Figure 3A:
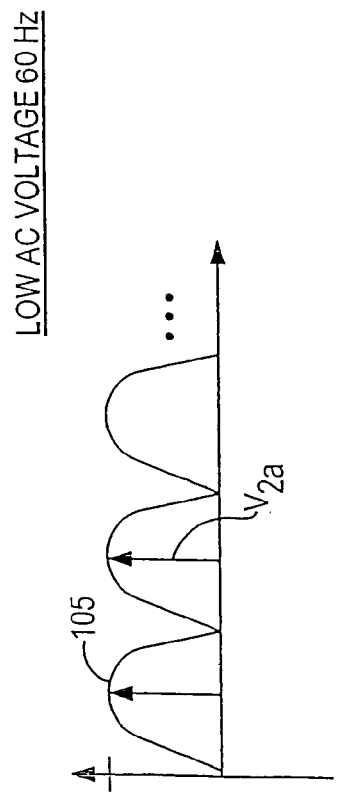
Figure 3B:
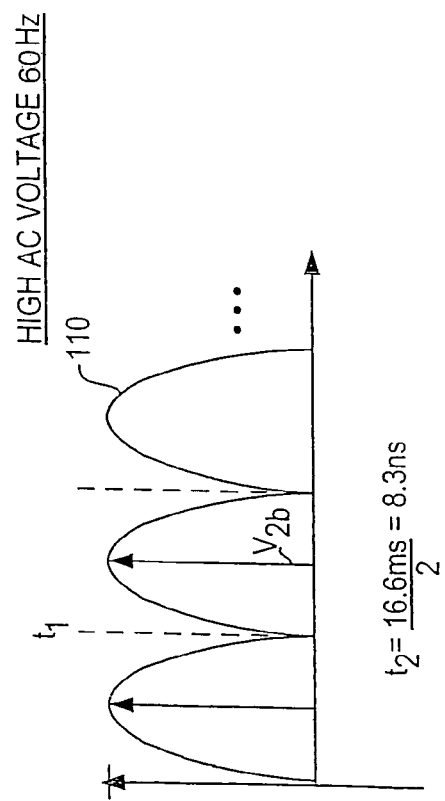

When power is first applied by AC power source 2, V2 is generated and buffered by amplifier 28. In this instance transistor 34 is initially off due to the high impedance in line 35 and due to the pull down resistor 32c. Assuming Voltage V3 is initially or normally at a lower power output, e.g., of 200 volts, the controller 36 then samples the input voltage via the A/D and determines the magnitude, frequency, or a combination thereof, of power from AC source 2 based on a comparison with one or more values previously stored in controller memory 38 or otherwise. If it is determined that the characteristics of AC source 2 is low voltage, e.g., 111 VAC, at 60 Hz (high frequency), as shown is FIG. 3a, controller 36 provides a control signal to control line 35 that is a logic 0 of approximately 0 volts, which keeps transistor 34 off. In this instance, the device 100 maintains the voltage V3 at the low power output of about 200 volts. If based on the comparison it is determined that the power from AC source 2 is a high voltage, e.g., 220 VAC, at 60 Hz, as shown in FIG. 3b, controller 36 provides a control signal output to line 35 that is a logic 1 of approximately 5 volts, which forges the drain end of transistor 34 to grounds thereby paralleling resistor 32a with resistor 32b. In this instance, the resistance seen by line 33 to ground increases V3 to a higher voltage, e.g., of about 400 volts, providing full power for inverter 50 and subsequently motor 61. Likewise, if the AC source is a low voltage 50 Hz (low frequency) as shown in FIG. 3c, controller 36 outputs a logic 0 onto line 35 keeping transistor 34 off and maintaining voltage V3 at 400 volts. This situation may arise in England where 110 VAC is fused at a higher amperage than in the (v.s. Similarly, controller 36 would maintain the on state of transistor 34 to maintain V3 at 400 volts for the AC source haversine waveform of FIG. 3d (high voltage, low frequency).

Referring to FIG. 4, an alternative embodiment is shown in which the power supply circuitry 101 is contained in a separate device that drives the electrically driven portion 102 of the device 100. In this respect, the common supply circuitry 101 may be manufactured for use with a variety of different types of devices, such as grinders, drills, saws, etc.

As noted above, the power supply circuit 101 generally determines the characteristic(s) of the incoming power source and provides or adjusts power output to drive the electrically driven portion 102 of the device. The circuit 101 may include at least one controller that is adapted for determining characteristic(s) of the incoming power source 2 by sensing the characteristic(s) of the incoming power source and comparing the characteristic(s) to one or more previously set reference value. In this instance, the controller provides a control signal for adjusting the power output to drive the device based on the characteristic(s) of the incoming power.

The output power may be adjusted in a variety of ways. For instance, the circuitry for adjusting the output power to drive the device may drive the device using low output power if it is determined that the incoming power source is a low voltage power source or drive the device with high output power if it is determined that the incoming power source is a high voltage power source. Similarly, the circuitry for adjusting the output power to drive the device may drive the device with high output power if it is determined that the incoming power source is a low frequency power source. Accordingly, the circuit may provide a control signal to increase the output power to drive a normally powered with low output power based on the characteristic(s) of the incoming power.

While the foregoing preferred embodiments of the invention have been described in some detail for purposes of clarity and understanding, it will be appreciated by one skilled in the art, from a reading of the disclosure, that various changes in form and detail can be made without departing from the scope of the invention, which is defined exclusively by the appended claims.

What is claimed is:

1. An electrically powered device deriving power from an incoming ac power source to produce output power to drive the device regardless of whether the incoming ac power source is of a first type of vower source or a second type of power source, the first type of power source having a higher voltage and lower frequency than the second type of power source having a lower voltage and higher frequency than the first type of power source, the device comprising:
   a first input power line and a second input power line, said first and second input power lines being connected to said incoming power source and having opposite polarity;
   first circuitry, connected to the second input power line, that determines the current drawn from the incoming power source; and
   second circuitry that receives a signal from said first circuitry indicative of the current drawn from the incoming power source and that modulates the voltage on the first input power line to drive the device, based on at least the signal from said first circuitry indicative of the current drawn from of the incoming power source, using a high output power if it is determined that the incoming power source is a higher voltage and lower frequency power source and using a low output power if it is determined that the incoming power source is a lower voltage and higher frequency power source.

2. The device of claim 1, wherein the device comprises at least one brushless DC motor and wherein the second circuitry that drives the device drives the at least one brushless DC motor with DC output power.

3. The device of claim 2, wherein the device is a power tool.

4. The device of claim 1, wherein the first circuitry that determines the current drawn from the incoming power source comprises at least one controller adapted for: sensing the current drawn from the incoming power source and comparing the current to one or more previously set reference values; and providing a control signal for adjusting the power output to drive the device based on the type incoming power source.

5. The device of claim 4, wherein the at least one controller provides a control signal to increase the output power to drive the device based on at least the signal from said first circuitry indicative of the current drawn from the incoming power source.

6. The device of claim 4, wherein the controller determines the current drawn from the incoming power and provides a control signal for adjusting the power output to drive the device based on the current drawn from the incoming power source.

7. The electrically powered device of claim 1, wherein the device derives power from the incoming AC power source to produce DC output power to drive the device, the device comprising:

at least one brushless DC motor; and
at least one controller adapted for:
determining the current drawn from the incoming AC power source, and
adjusting the DC output power to drive the at least one brushless DC motor based on at least the current drawn from the incoming AC power source.

8. The electrically powered device of claim 1, wherein the device derives power from the incoming AC power source to produce DC output power to drive the device, the device comprising:

at least one brushless DC motor; and
at least one controller adapted for:
determining at least one of a voltage and a frequency of the incoming AC power source, and
increasing the DC output power to drive the at least one brushless DC motor, if it is determined that the incoming power source is a high voltage and low frequency power source.

9. A device for driving an electrically powered device regardless of whether an incoming ac power source is of a first type of power source or a second type of power source, the first type of power source having a higher voltage and lower frequency than the second type of power source having a lower voltage and higher frequency than the first type of power source, comprising:

a first input input power line of positive polarity and a second input power line of negative polarity, said first and second input power lines being connected to said incoming power source;
first circuitry, connected to the second input power line, that determines the current drawn from the incoming power source; and
second circuitry that receives a signal from said first circuitry indicative of the current drawn from the incoming power source and that provides an output signal based on the at least the signal from said first circuitry indicative of the current drawn from the incoming power source and modulating the voltage on the first input power line to drive the device, using a high output power level if it is determined that the incoming power source is a higher voltage and lower frequency power source, and using a low output power level if it is determined that the incoming power source is a lower voltage and higher frequency power source.

10. The device of claim 9, wherein the electrically powered device comprises at least one brushless DC motor and wherein the second circuitry that drives the device drives the at least one brushless DC motor with DC output power.

11. The device of claim 9, wherein the first circuitry for determining the current drawn from the incoming power source comprises at least one controller adapted for:

sensing the current drawn from the incoming power source and comparing the current to one or more previously set reference values; and
providing a control signal for adjusting the power output to drive the electrically powered device based on the type of incoming power source.

12. The device of claim 11, wherein the at least one controller provides a control signal to increase the output power to drive the electrically powered device based on at least the signal from said first circuitry indicative of the current drawn from the incoming power source.

13. The device of claim 11, wherein the controller determines current drawn from the incoming power source and provides a control signal for adjusting the power output to drive the electrically powered device based on at least current drawn from the incoming power source.

14. A method for driving an electrically powered device regardless of whether an incoming ac power source is of a first type of power source or a second type of power source, the first type of power source having a higher voltage and lower frequency than the second type of power source having a lower voltage and higher frequency than the first type of power source, comprising:

determining at least the current drawn from the incoming power source on a first input power line or second input power line, the first and second input power lines having opposite polarity; and
modulating power on the first input power line to drive the electrically powered device based on at least the current drawn from the incoming power source, using a high output power level if it is determined that the incoming power source is a higher voltage and lower frequency power source, and using a low output power level if it is determined that the incoming power source is a lower voltage and higher frequency power source.

15. The method of claim 14, wherein the electrically powered device comprises at least one brushless DC motor and wherein the output power is adjusted to drive the at least one brushless DC motor with DC output power.

16. The method of claim 14, wherein the step of determining the current drawn from the incoming power source comprises sensing the current drawn from the incoming power source and comparing the current drawn from the incoming power source to one or more previously set reference values; and wherein the step of modulating the power output to drive the electrically powered device comprises providing a control signal to drive the electrically power device based on the current drawn from the incoming power source.

17. The method of claim 14, wherein the output power to drive the electrically powered device is increased based on the current drawn from the incoming power source.

* * * * *